(12) United States Patent
Maeda

(10) Patent No.: US 11,573,729 B2
(45) Date of Patent: Feb. 7, 2023

(54) STORAGE DEVICE AND STORAGE CONTROL METHOD

(71) Applicant: FUJITSU LIMITED, Kawasaki (JP)

(72) Inventor: Jun Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 17/371,164

(22) Filed: Jul. 9, 2021

(65) Prior Publication Data
US 2022/0091746 A1    Mar. 24, 2022

(30) Foreign Application Priority Data

Sep. 23, 2020   (JP) .............................. JP2020-158905

(51) Int. Cl.
*G06F 12/00*   (2006.01)
*G06F 3/06*    (2006.01)

(52) U.S. Cl.
CPC ............ *G06F 3/065* (2013.01); *G06F 3/0619* (2013.01); *G06F 3/0644* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 2005/0160248 | A1  | 7/2005  | Yamagami |
| 2011/0246599 | A1  | 10/2011 | Kawada |
| 2015/0324139 | A1* | 11/2015 | Inoue ................... G06F 3/0605 711/165 |
| 2016/0117106 | A1* | 4/2016  | Ihara .................... G06F 3/0673 711/156 |
| 2016/0230976 | A1* | 8/2016  | Moon .................... F21K 9/232 |

FOREIGN PATENT DOCUMENTS

| JP | 2005-276162 A | 10/2005 |
| JP | 2011-215947 A | 10/2011 |

* cited by examiner

*Primary Examiner* — Daniel D Tsui
(74) *Attorney, Agent, or Firm* — Fujitsu Patent Center

(57) ABSTRACT

A storage device communicably coupled to a host device and another storage device includes a memory and a processor coupled to the memory and configured to: write, in a case where an area release command of a transaction volume is issued from the host device while data backup processing is performed with the another storage device using a generation-managed transmission buffer, the area release command in a first generation of the transmission buffer; and switch, in a case where a range of data write processing requested by the host device overlaps a range specified by the area release command written in the first generation, a generation of the transmission buffer from the first generation to a second generation.

10 Claims, 17 Drawing Sheets

STORAGE DEVICE AND STORAGE CONTROL METHOD

CROSS-REFERENCE TO RELATED APPLICATION

This application is based upon and claims the benefit of priority of the prior Japanese Patent Application No. 2020-158905, filed on Sep. 23, 2020, the entire contents of which are incorporated herein by reference.

FIELD

The embodiment discussed herein is related to a storage device and a storage control method.

BACKGROUND

During operation of asynchronous data copying performed among multiple connected storage systems, a SCSI UNMAP command is issued from a host computer. In a case where SCSI UNMAP is issued to a copy source, physical allocation of a copy destination corresponding to the range having been subject to area release in the copy source is also released to maintain data integrity. However, in asynchronous data copying having a mechanism of transferring data written using a buffer to maintain sequentiality of transferred data, area release processing of the copy destination is performed in consideration of the sequentiality with the buffer transfer in a case where UNMAP is issued in the copy source of the asynchronous data copying.

Japanese Laid-open Patent Publication No. 2011-215947 and Japanese Laid-open Patent Publication No. 2005-276162 are disclosed as related art.

SUMMARY

According to an aspect of the embodiments, a storage device communicably coupled to a host device and another storage device includes a memory and a processor coupled to the memory and configured to: write, in a case where an area release command of a transaction volume is issued from the host device while data backup processing is performed with the another storage device using a generation-managed transmission buffer, the area release command in a first generation of the transmission buffer; and switch, in a case where a range of data write processing requested by the host device overlaps a range specified by the area release command written in the first generation, a generation of the transmission buffer from the first generation to a second generation.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to assure sequentiality of write data and an UNMAP process, it is conceivable to assume the UNMAP as Write Input/Output (I/O) of 0 data, and to store 0 data in the buffer for the size of the UNMAP to execute data copying processing. Meanwhile, since the recovery capacity of the asynchronous data copying depends on the size of the buffer per generation, the size of the buffer per generation is approximately the order of the size of one I/O (e.g., several MB). However, since the size of the UNMAP issued by the host computer may be issued in the order of several GB, there is a possibility that data on the backup side may appear as meaningless data if a failure occurs before the transfer is complete.

In one aspect, sequentiality of a process in data backup may be assured.

[A] Related Example

Figure 1:
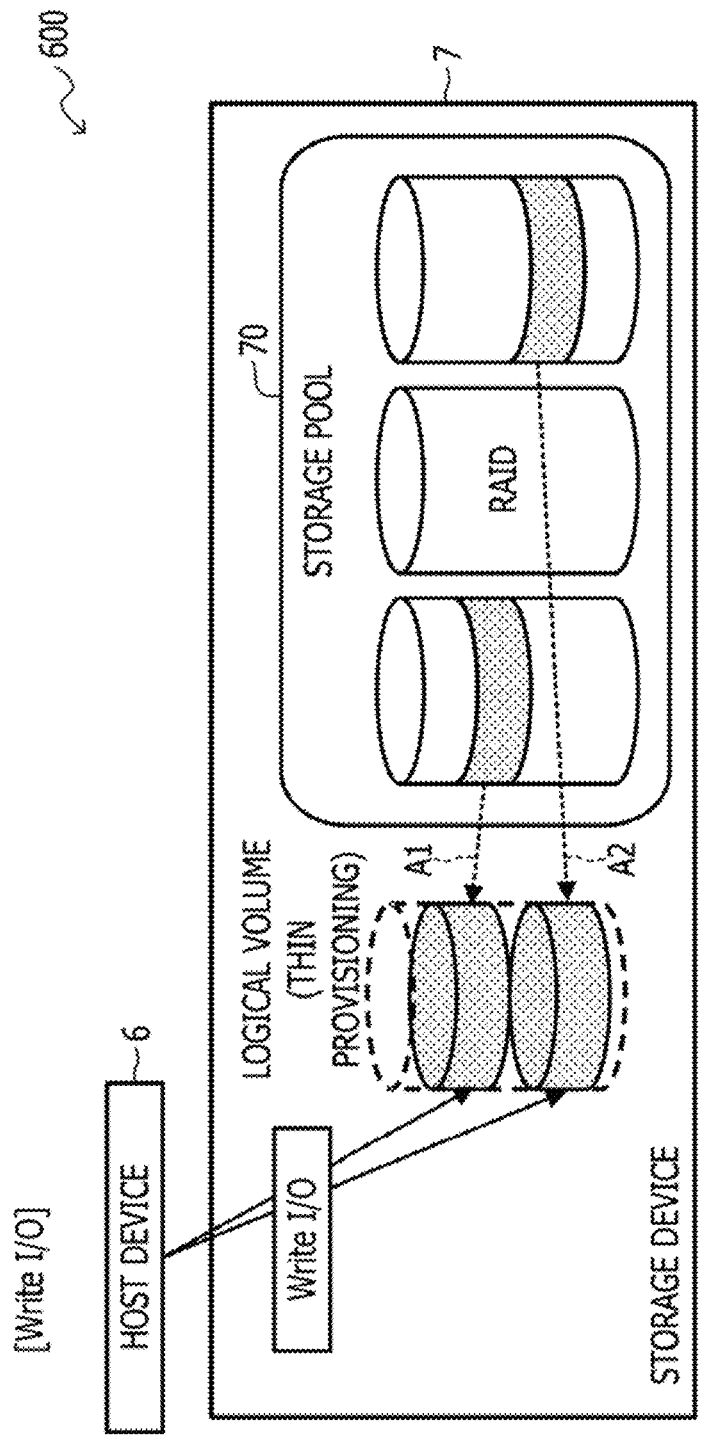
FIG. 1 is a block diagram illustrating a Write I/O process in a storage system as a related example.
Figure 2:
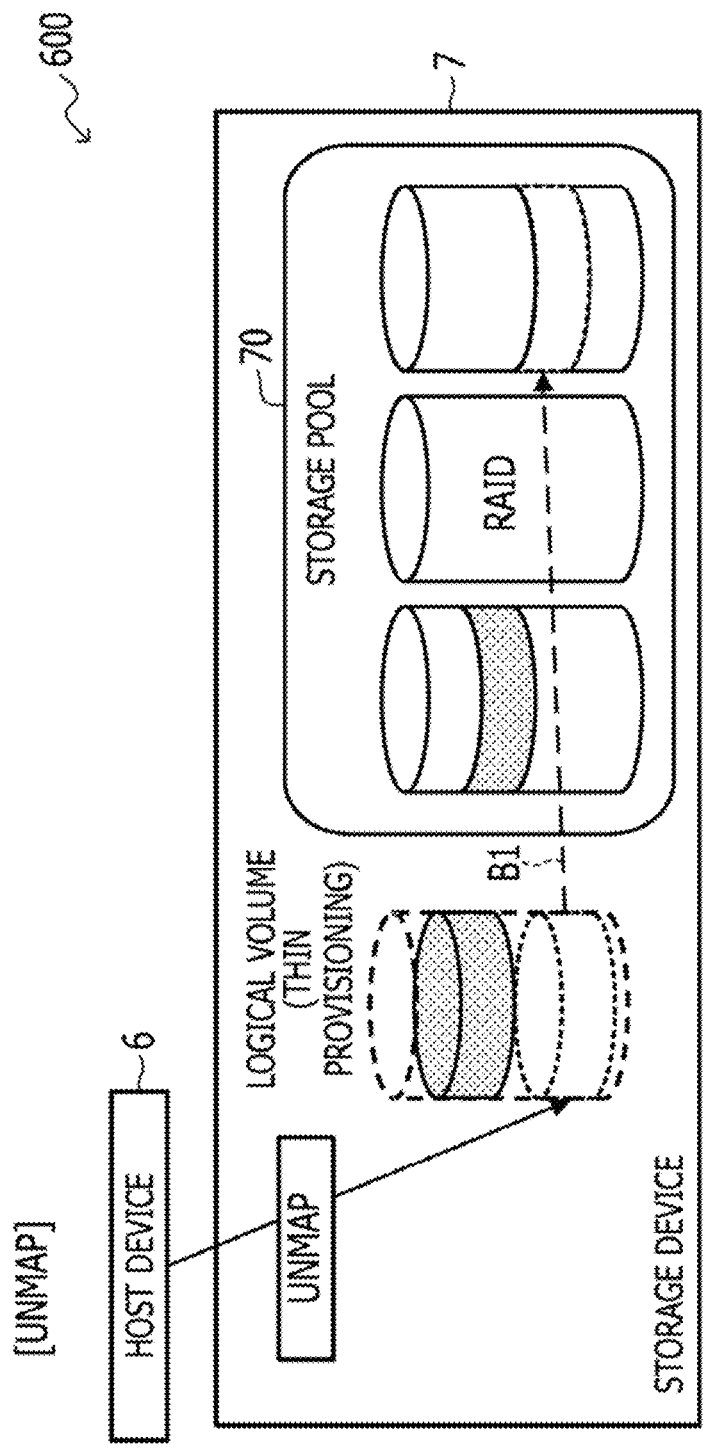
FIG. 2 is a block diagram illustrating an UNMAP process in a storage system as a related example.

FIG. 1 is a block diagram illustrating a Write I/O process in a storage system 600 as a related example. FIG. 2 is a block diagram illustrating an UNMAP process in the storage system 600 as a related example.

The storage system 600 illustrated in FIGS. 1 and 2 includes a host device 6 and a storage device 7. The storage device 7 includes a storage pool 70 containing a plurality of disks included in redundant arrays of independent disks (RAID).

Thin provisioning is a way of efficiently using resources in the storage device 7. In the thin provisioning, the host device 6 connected to the storage device 7 is made to recognize a virtual volume (i.e., logical volume). Then, each time the host device 6 issues a Write I/O, the required amount of actual storage resources are allocated to the logical volume from the storage pool 70, as indicated by reference signs A1 and A2 in FIG. 1.

Furthermore, an SCSI UNMAP command is issued to the unused area after physical resources have been allocated due to file deletion from a file system or the like, thereby releasing the allocation of the physical resources, as indicated by a reference sign B1 in FIG. 2.

Figure 3:
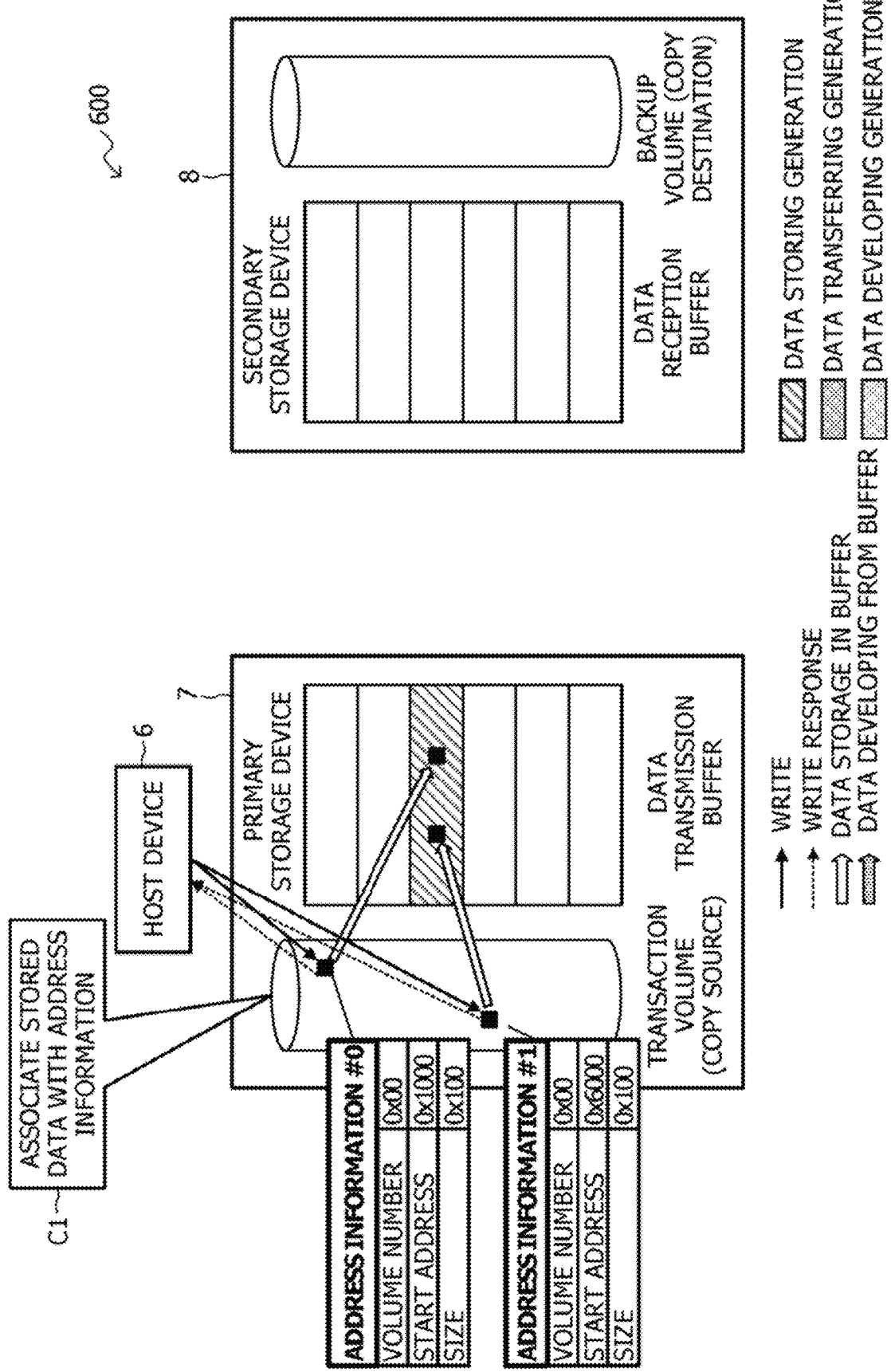
FIG. 3 is a block diagram illustrating a process of writing data to a copy source of asynchronous backup between housings in a storage system as a related example.
Figure 4:
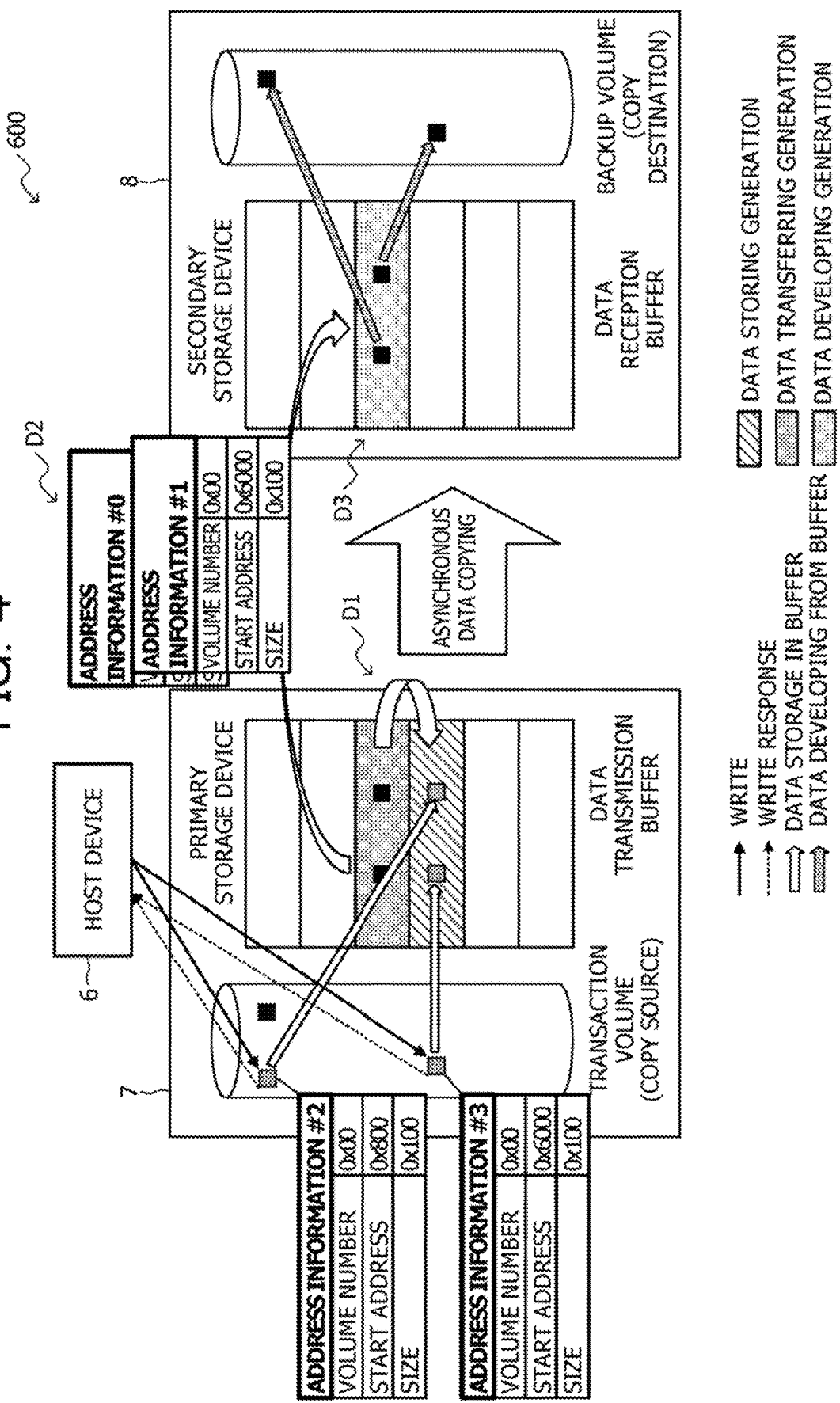
FIG. 4 is a block diagram illustrating a process of switching a buffer generation of asynchronous backup between housings in a storage system as a related example.

FIG. 3 is a block diagram illustrating a process of writing data in the storage system 600 as a related example. FIG. 4 is a block diagram illustrating a process of switching a buffer generation in the storage system 600 as a related example.

In the storage system 600 illustrated in FIGS. 3 and 4, in addition to the primary storage device 7 directly connected to the host device 6, a secondary storage device 8 connected to the host device 6 via the primary storage device 7 is illustrated.

In the storage system 600, data stored in the primary storage device 7 may be backed up by a firmware of the primary storage device 7 without using the resources of the host device 6 at times.

In backing up the data, the data of the copy source/copy destination is made redundant in the volume pair between multiple housings, and the relationship of the copy pair may be temporarily separated when the copy source/copy destination becomes equivalent at times.

Asynchronous data copying is one of data transfer methods in such backup. In the asynchronous data copying, in a case where data is written to the copy source on the primary housing side of the backup pair, data copying is performed on the copy destination volume of the session on the secondary housing side via inter-housing communication while a response to the writing is asynchronous. In the asynchronous data copying, data transfer is carried out using generation-managed buffers in a memory space to maintain sequentiality of the data.

As illustrated in FIG. 3, in the asynchronous data copying, in a case where there is a write from the host computer, the data is written to the copy source volume and a response is returned to the host computer, and then the data written to the volume is copied to a data transmission buffer, not being subject to data transfer directly.

As indicated by a reference sign C1 in FIG. 3, stored data and address information are associated with each other in the transaction volume of the copy source. The address information may include a volume number, a start address, and a size.

As illustrated in FIG. 4, buffers are generation-managed, and generation switching is carried out after a certain period of time has elapsed or when the buffers are full. After the generation switching, data transfer in the buffer of the generation having been used before the switching is carried out. With the data transfer for each generation of the buffer carried out in this manner, the sequentiality assurance in a generation unit of the buffer is achieved. In a case where a failure occurs in an operation site during operation of asynchronous data copying, a recovery point objective (RPO) at the time of resuming the transaction in a backup site is data before the data for one generation stored in the buffer is transferred.

At the time of transferring the data in the buffer from the primary housing to the secondary housing, address information of the buffer is also transferred. The address information retains information such as which address of which volume the write data to the copy source of the session stored in the buffer has been written to.

As indicated by a reference sign D1 in FIG. 4, when the data transmission buffer is switched from a data transferring generation to a data storing generation, address information #2 and #3 of the data storing generation is stored in addition to address information #0 and #1 of the data transferring generation in the transaction volume of the copy source.

As indicated by a reference sign D2 in FIG. 4, at the time of transferring data in the data transmission buffer, the address information #0 and #1 of the data transferring generation is also transferred.

As indicated by a reference sign D3 in FIG. 4, the data is received in a data reception buffer of a data developing generation in the secondary storage device 8 of the copy destination. Then, a data storage position in the backup volume of the copy destination in the secondary storage device 8 is determined on the basis of the address information #0 and #1 received together.

In order to assure sequentiality of write data and an UNMAP process, it is conceivable to assume the UNMAP as Write Input/Output (I/O) of 0 data, and to store 0 data in the buffer for the size of the UNMAP to execute data copying processing. Meanwhile, since the recovery capacity of the asynchronous data copying depends on the size of the buffer per generation, the size of the buffer per generation is approximately the order of the size of one I/O (e.g., several MB). However, since there is a possibility that the UNMAP size issued by the host computer may be issued in the order of several GB, the size of the buffer per generation needs to be prepared in the GB order to complete the transfer of all 0 data in one buffer transfer. Accordingly, although it may be assumed that 0 data is stored by being divided into buffers, if a failure occurs before the transfer is complete, there is a possibility that the data on the backup side may appear as meaningless data.

[B] Embodiment

Hereinafter, one embodiment will be described with reference to the drawings. Note that the embodiment to be described below is merely an example, and there is no intention to exclude application of various modifications and techniques not explicitly described in the embodiment. For example, the present embodiment may be modified in various ways to be implemented without departing from the spirit thereof. Furthermore, each drawing is not intended to include only the constituent elements illustrated in the drawing, and may include other functions and the like.

Hereinafter, the same respective reference signs represent similar parts in the drawings, and thus descriptions thereof will be omitted.

[B-1] Exemplary Configuration

Figure 5:
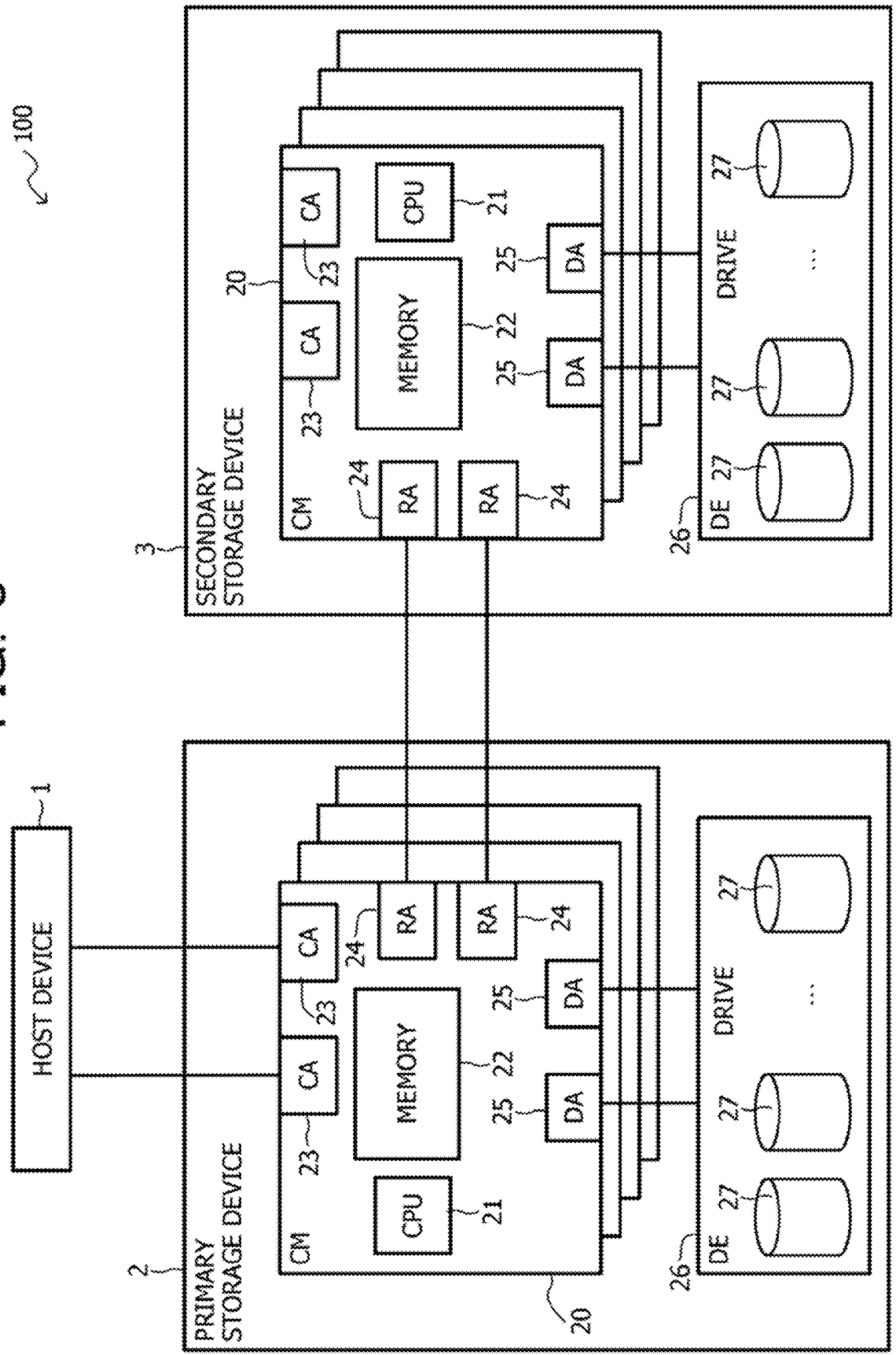
FIG. 5 is a block diagram schematically illustrating an exemplary hardware configuration of a storage system as an exemplary embodiment.

FIG. 5 is a block diagram schematically illustrating an exemplary hardware configuration of a storage system 100 as an exemplary embodiment.

The storage system 100 includes a host device 1, a primary storage device 2, and a secondary storage device 3.

In the example illustrated in FIG. 5, the primary storage device 2 is directly connected to the host device 1, and the secondary storage device 3 is connected to the host device 1 via the primary storage device 2. Note that the secondary storage device 3 may be directly connected to the host device 1. The primary storage device 2 and the secondary storage device 3 have similar hardware configurations.

Hereinafter, the primary storage device 2 and the secondary storage device 3 may be collectively referred to as storage devices 2 and 3.

The host device 1 is, for example, a computer having a server function, and issues commands of Read, Write I/O, and UNMAP to the primary storage device 2. While the storage system 100 includes one host device 1 in the example illustrated in FIG. 5, the number of the host devices 1 to be included in the storage system 100 may be changed in various ways.

The storage devices 2 and 3 include a plurality of controller modules (CMs) 20, and a disk enclosure (DE) 26.

The DE 26 is communicably connected to each of the CMs 20 via an access path for redundancy, and includes a plurality of drives 27. The drive 27 is a device that stores data in a readable and writable manner, and for example, a hard disk drive (HDD), a solid state drive (SSD), or a storage class memory (SCM) may be used. The drive 27 of the primary storage device 2 stores data of a transaction volume, and the drive 27 of the secondary storage device 3 stores data of a backup volume.

The CM 20 includes a central processing unit (CPU) 21, a memory 22, a communication adapter (CA) 23, a remote adapter (RA) 24, and a device adapter (DA) 25.

The memory 22 is, for example, a storage device including a read only memory (ROM) and a random access memory (RAM). The RAM may be, for example, a dynamic RAM (DRAM). In the ROM of the memory 22, programs such as a basic input/output system (BIOS) may be written. A software program of the memory 22 may be appropriately read and executed by the CPU 21. Furthermore, the RAM of the memory 22 may be used as a primary recording memory or a working memory. The memory 22 retains a primary buffer, address information, and the like.

The CA 23 is an interface that communicably connects the host device 1 with the storage devices 2 and 3. While the primary storage device 2 is connected to the host device 1, the secondary storage device 3 has a free port.

The RA 24 is an interface for connecting the storage devices 2 and 3 to each other, and executes data transfer and address information transfer.

The DA 25 is an interface for communicably connecting the CM 20 and the DE 26, which is, for example, a fiber channel (FC) adapter.

The CPU 21 is, for example, a processor that performs various kinds of control and calculation, and implements various functions by executing an operating system (OS) and programs stored in the memory 22.

Note that a program that Implements various functions may be provided in a form recorded in a computer-readable recording medium such as a flexible disk, a compact disc (CD) (CD-ROM, CD-recordable (R), CD-rewritable (RW), etc.), a digital versatile disc (DVD) (DVD-ROM, DVD-RAM, DVD-R, DVD+R, DVD-RW, DVD+RW, high definition (HD) DVD, etc.), a Blu-ray disc, a magnetic disc, an optical disc, a magneto-optical disc, or the like. Then, a computer (CPU 21 in the present embodiment) may read the program from the recording medium described above via a reading device (not Illustrated), transfer and store it in an internal recording device or an external recording device, and use it. Furthermore, the program may be recorded in a storage device (recording medium) such as a magnetic disc, an optical disc, a magneto-optical disc, or the like, and may be provided to the computer from the memory device via a communication path.

At the time of implementing various functions, the program stored in the internal storage device (memory 22 in the present embodiment) may be executed by the computer (CPU 21 in the present embodiment). Furthermore, the computer may read and execute the program recorded in the recording medium.

Figure 6:
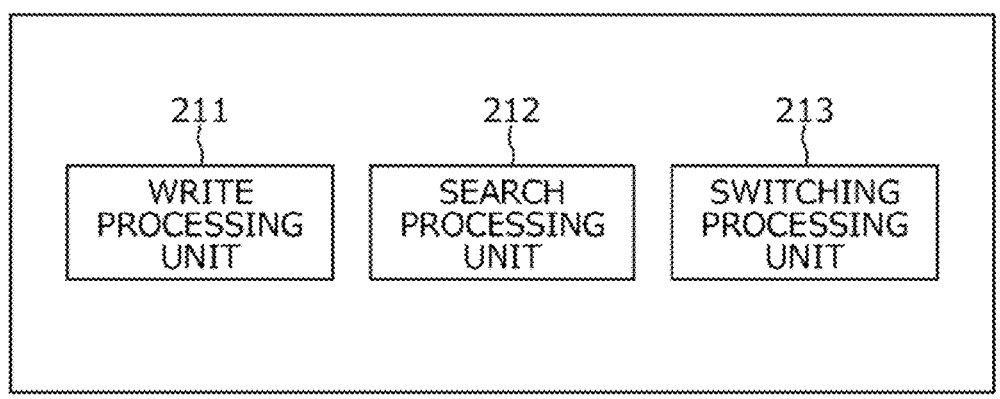
FIG. 6 is a block diagram schematically illustrating an exemplary software configuration of a primary storage device illustrated in FIG. 5.

FIG. 6 is a block diagram schematically Illustrating an exemplary software configuration of the primary storage device 2 illustrated in FIG. 5.

The CPU 21 of the primary storage device 2 functions as a write processing unit 211, a search processing unit 212, and a switching processing unit 213.

There may be a case where the host device 1 issues an area release command of a transaction volume while data backup processing is performed with the secondary storage device 3 using a generation-managed data transmission buffer. In such a case, the write processing unit 211 writes the area release command to the first generation of the data transmission buffer.

The write processing unit 211 may register a flag indicating the issuance of the area release command in the address Information, and may transfer the address information to the secondary storage device 3.

There may be a case where an area release command is issued after a data write processing request is issued, and the range of the data write processing requested by the host device 1 overlaps the range specified by the area release command written to the first generation by the write processing unit 211. In such a case, the write processing unit 211 may delete the data related to the data write processing written to the data transmission buffer, and may write dummy data.

The search processing unit 212 searches for the address information and the area release command stored in the data transmission buffer.

In a case where the range of the data write processing requested by the host device 1 overlaps the range specified by the area release command written to the first generation by the write processing unit 211, the switching processing unit 213 switches the generation of the data transmission buffer from the first generation to the second generation.

The switching processing unit 213 may detect an overlap on the basis of the address information including the volume number of the transaction volume, the start address of the area, and the size of the area.

Figure 14:
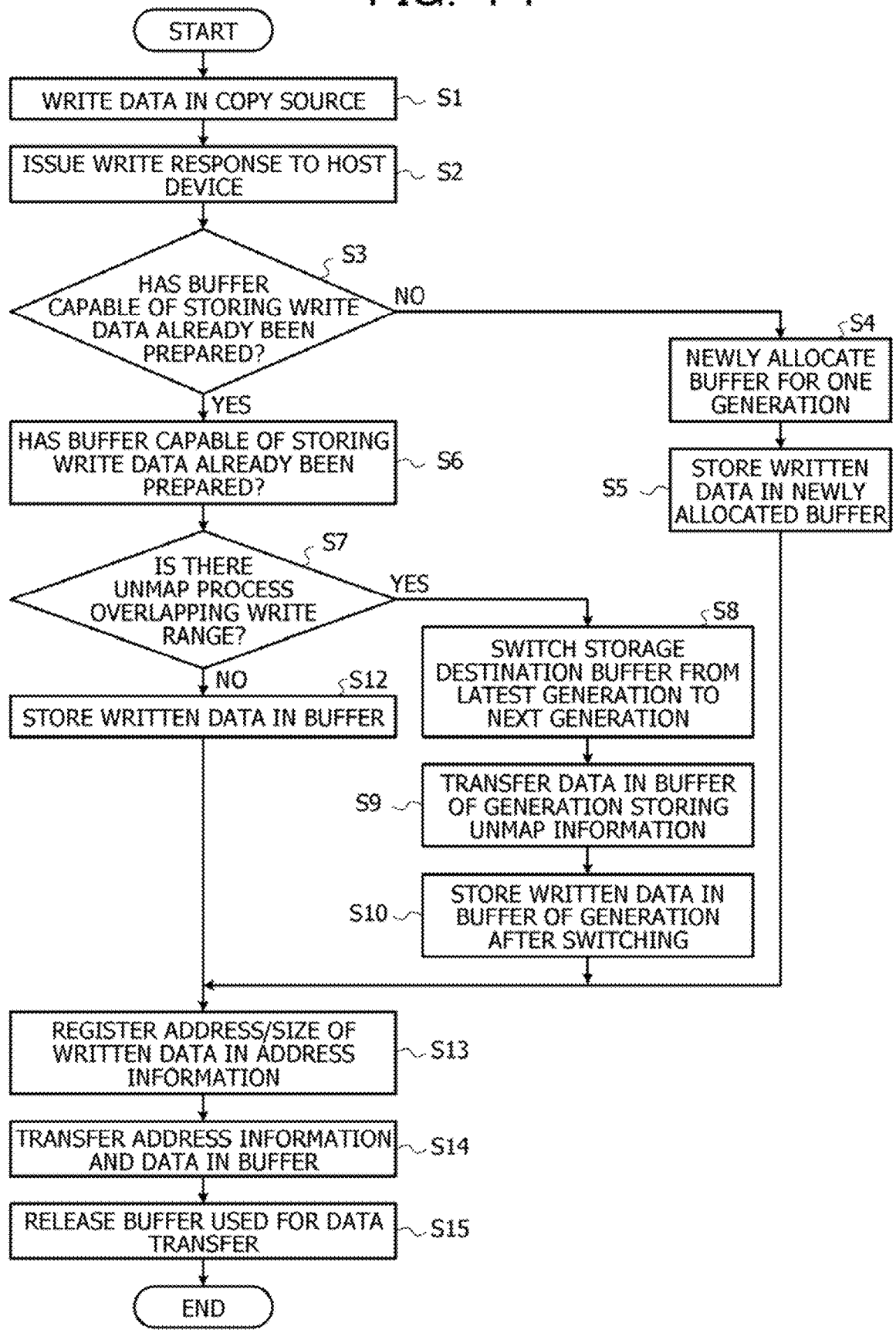
FIG. 14 is a flowchart illustrating a process of writing data in a primary storage device of a copy source in a storage system as an exemplary embodiment.
Figure 16:
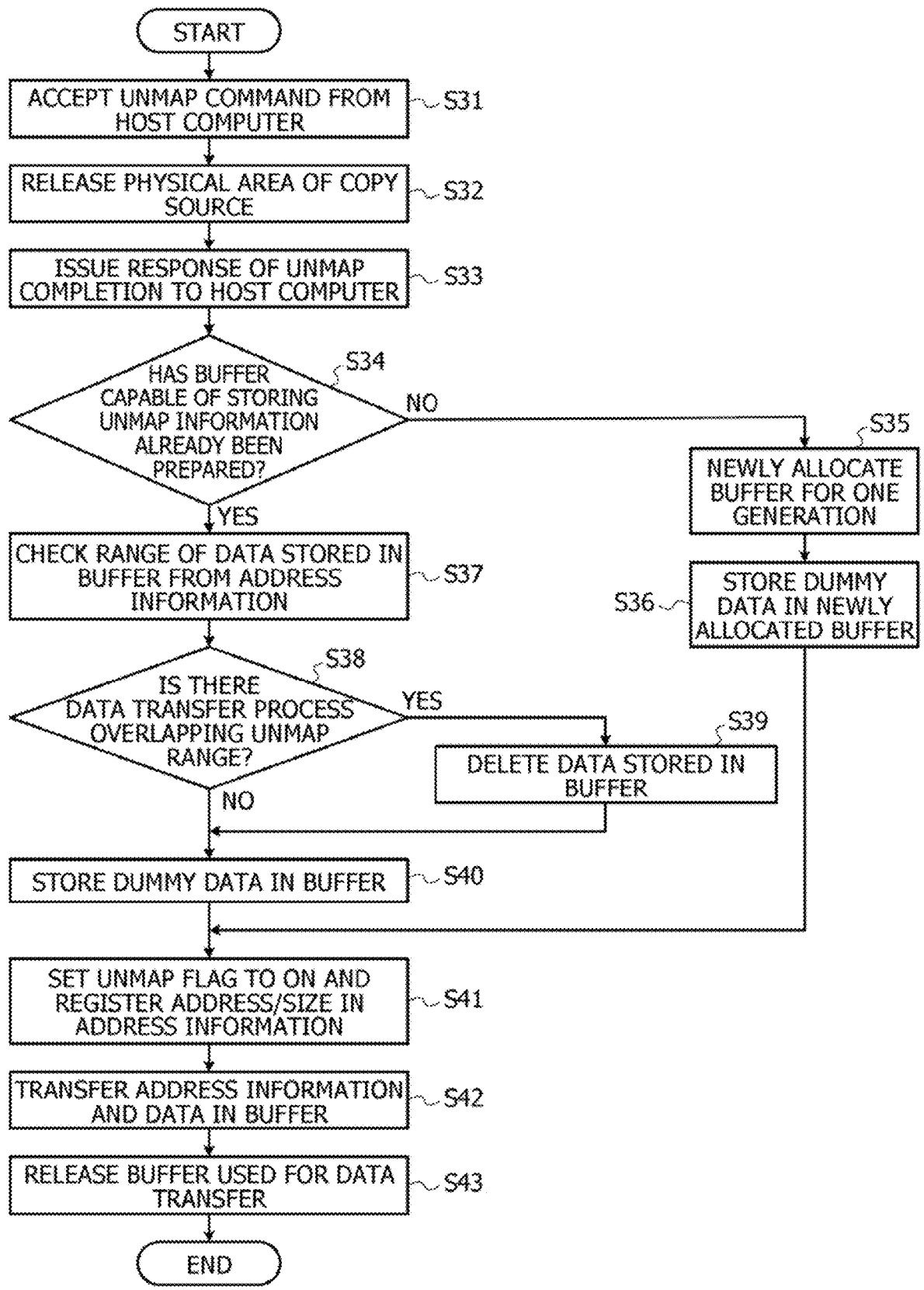
FIG. 16 is a flowchart illustrating an UNMAP process in a primary storage device of a copy source in a storage system as an exemplary embodiment.

Details of the processing by the write processing unit 211, the search processing unit 212, and the switching processing unit 213 will be described later with reference to FIGS. 14 and 16 and the like.

Figure 7:
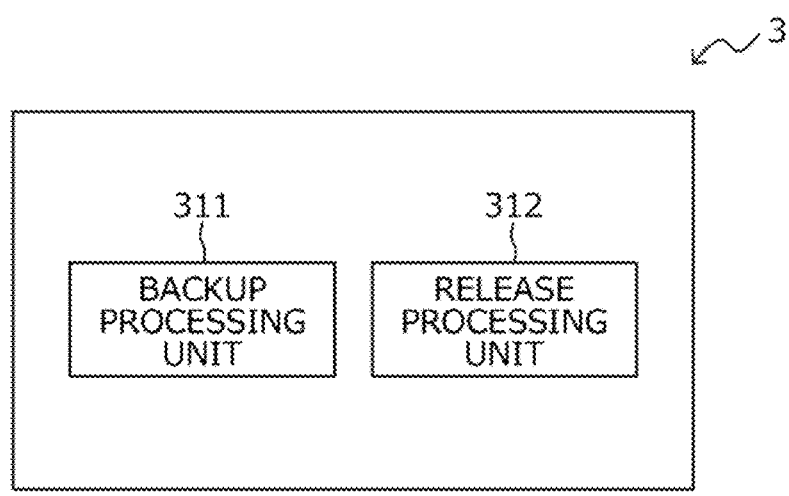
FIG. 7 is a block diagram schematically illustrating an exemplary software configuration of a secondary storage device illustrated in FIG. 5.

FIG. 7 is a block diagram schematically illustrating an exemplary software configuration of the secondary storage device 3 illustrated in FIG. 5.

The CPU 21 of the secondary storage device 3 functions as a backup processing unit 311 and a release processing unit 312.

The backup processing unit 311 is an example of a read processing unit that reads the area release command transferred from the primary storage device 2 and stored in the data reception buffer.

The release processing unit 312 releases the area of the backup volume on the basis of the area release command read by the backup processing unit 311.

Figure 15:
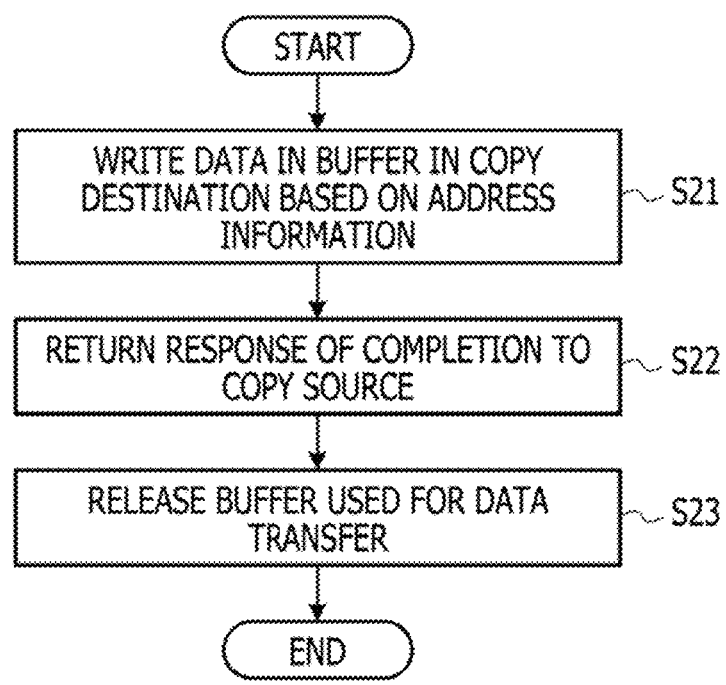
FIG. 15 is a flowchart illustrating a process of writing data in a secondary storage device of a copy destination in a storage system as an exemplary embodiment.
Figure 17:
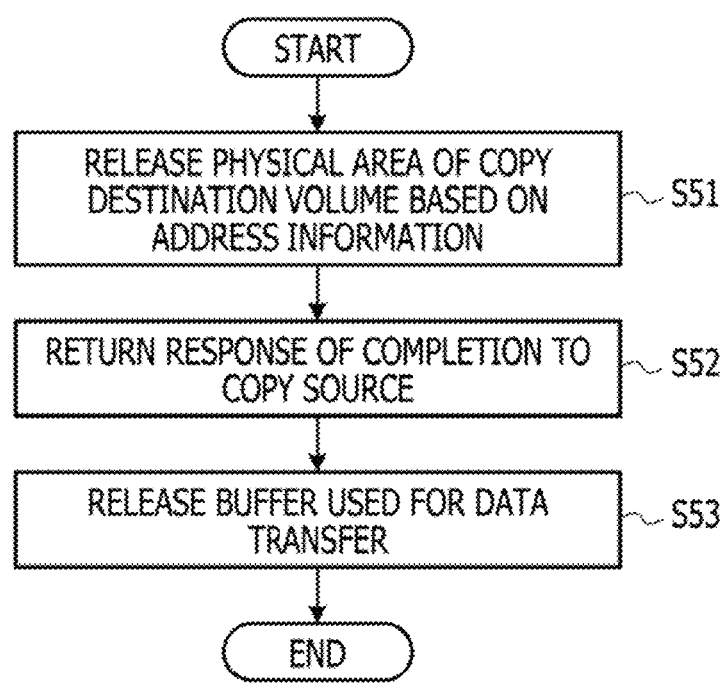
FIG. 17 is a flowchart illustrating an UNMAP process in a secondary storage device of a copy destination in a storage system as an exemplary embodiment.

Details of the processing by the backup processing unit 311 and the release processing unit 312 will be described later with reference to FIGS. 15 and 17 and the like.

Figure 8:
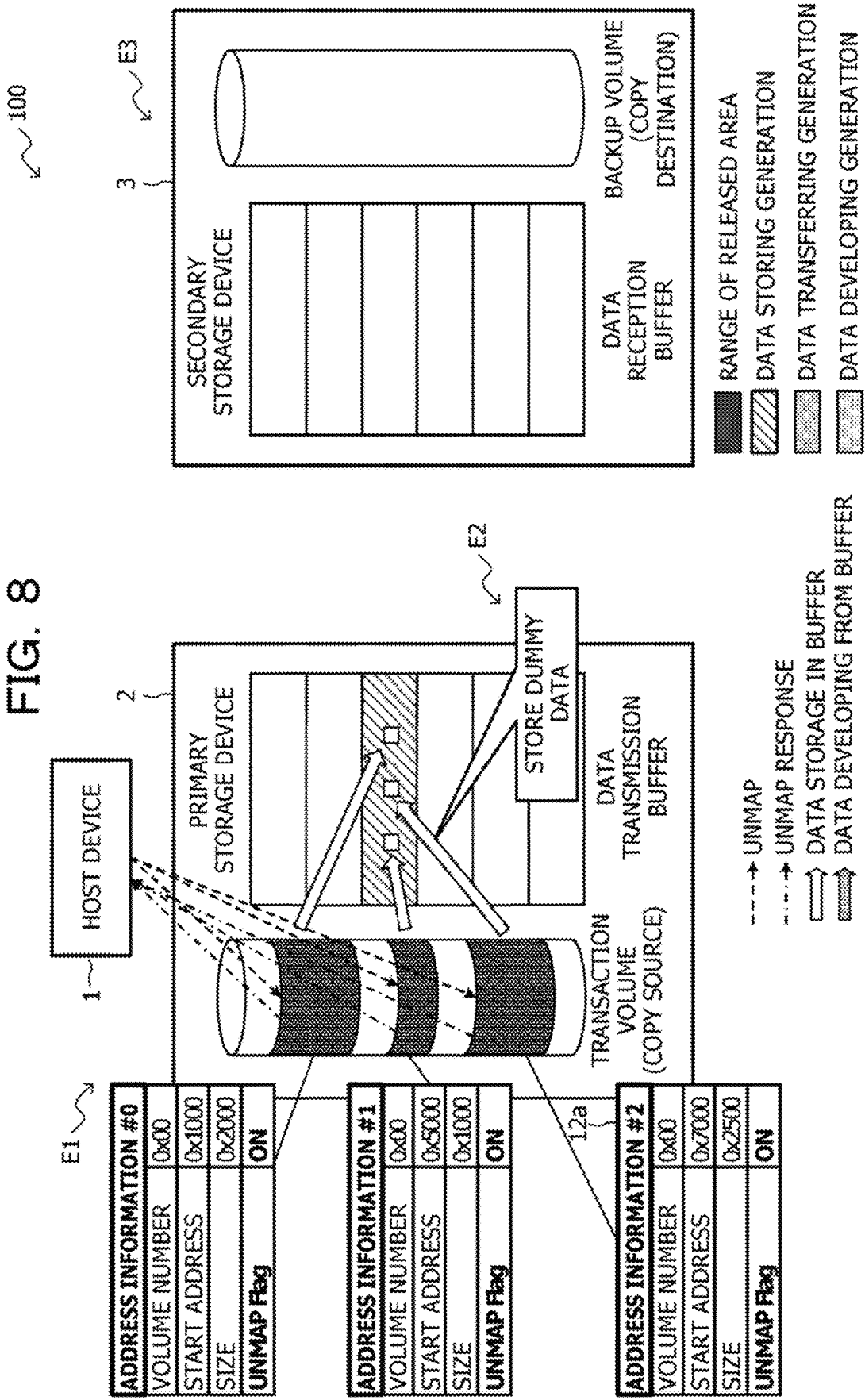
FIG. 8 is a block diagram illustrating an UNMAP process in the storage system illustrated in FIG. 5.
Figure 9:
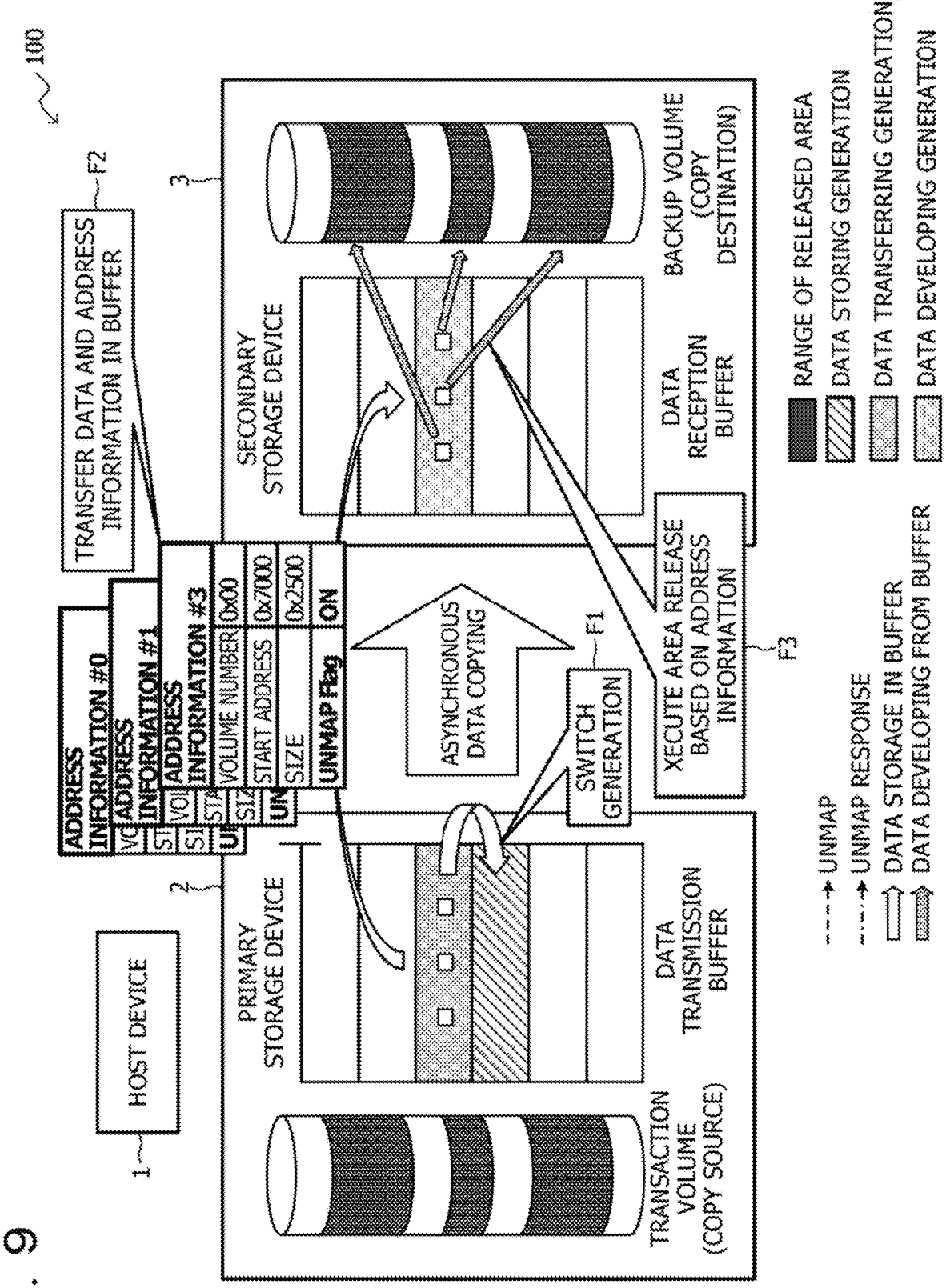
FIG. 9 is a block diagram illustrating a process of switching a buffer generation in the storage system illustrated in FIG. 5.

FIG. 8 is a block diagram illustrating an UNMAP process in the storage system 100 illustrated in FIG. 5. FIG. 9 is a block diagram illustrating a process of switching a buffer generation in the storage system 100 illustrated in FIG. 5.

As indicated by a reference sign E1 in FIG. 8, in a case where UNMAP is issued to the primary storage device 2 of the copy source, the physical area of the transaction volume of the copy source is released. Then, as indicated by a reference sign E2 in FIG. 8, dummy data of a small size is stored in the data transmission buffer, and a flag for indicating that the UNMAP command has been received is set in the address information storing information of data to be subject to buffer transfer.

The address Information may include an UNMAP Flag in addition to the volume number, the start address, and the size. With the UNMAP Flag set to ON, reception of the UNMAP command is Indicated. In the example illustrated in FIG. 8, the UNMAP Flag of the address information #0 to #2 is set to ON.

When the data transmission buffer is switched from the data transferring generation to the data storing generation as indicated by a reference sign F1 in FIG. 9, the data and addresses in the data transmission buffer storing the dummy data are transferred as indicated by a reference sign F2 in FIG. 9. As indicated by a reference sign F3 in FIG. 9, the secondary storage device 3 receives the data and addresses, and then the setting of the UNMAP Flag of the address information is checked to determine whether to execute a physical release of the backup volume of the copy destination. If the UNMAP Flag is ON, the physical area of the copy destination in the specified range is released.

In a case where write data of the area that overlaps with the UNMAP is already stored in the buffer at the time of executing the buffer transfer of the UNMAP command, the data may be discarded. Furthermore, in a case where writing is performed on the area that overlaps with the UNMAP after the command information of the UNMAP is stored in the buffer, generation switching of the buffer is executed, and the UNMAP is completed before the transfer of the write data, thereby assuring the sequentiality.

Figure 10:
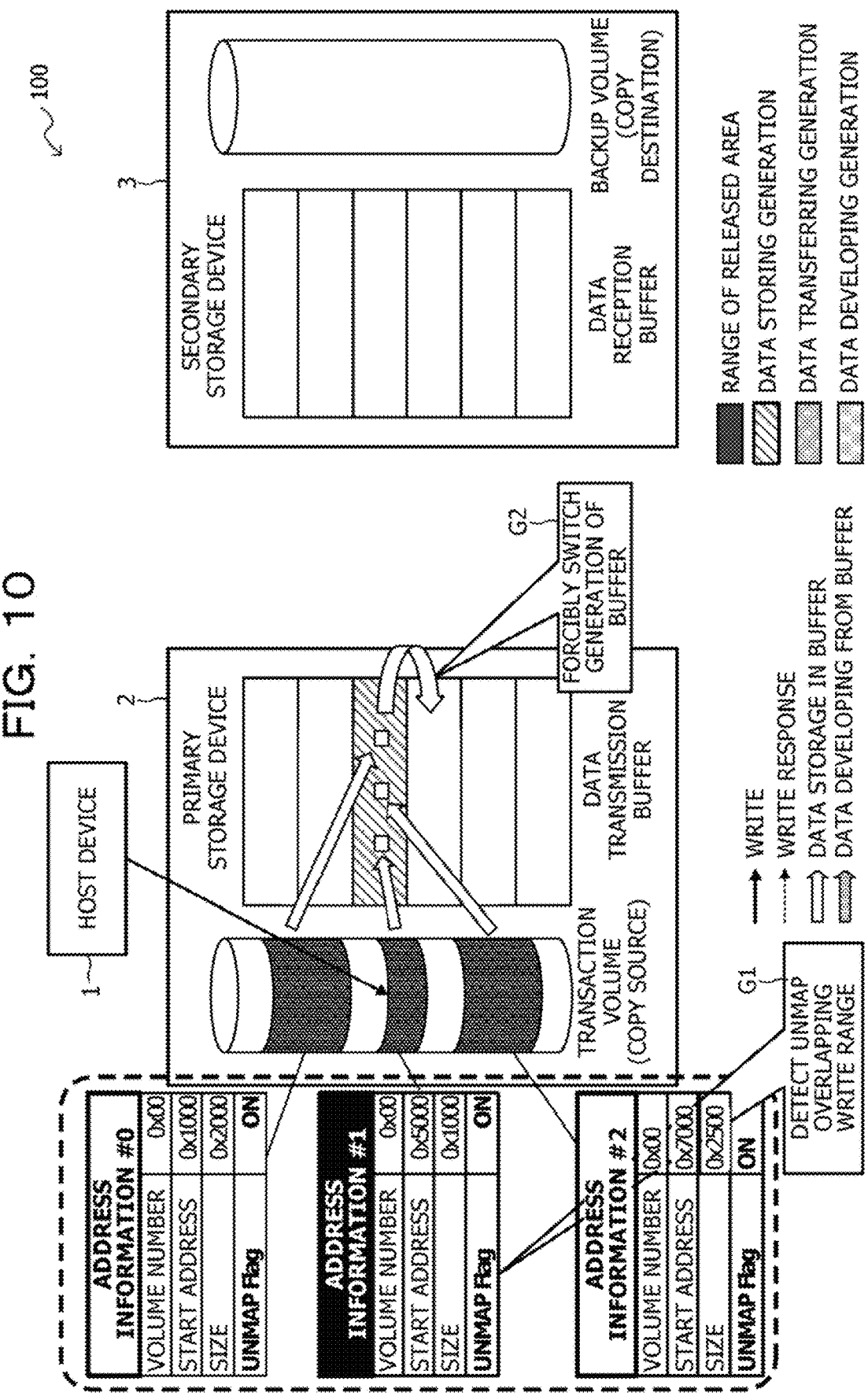
FIG. 10 is a block diagram illustrating a write process and the process of switching a buffer generation immediately after Issuance of an UNMAP command in the storage system illustrated in FIG. 5.
Figure 11:
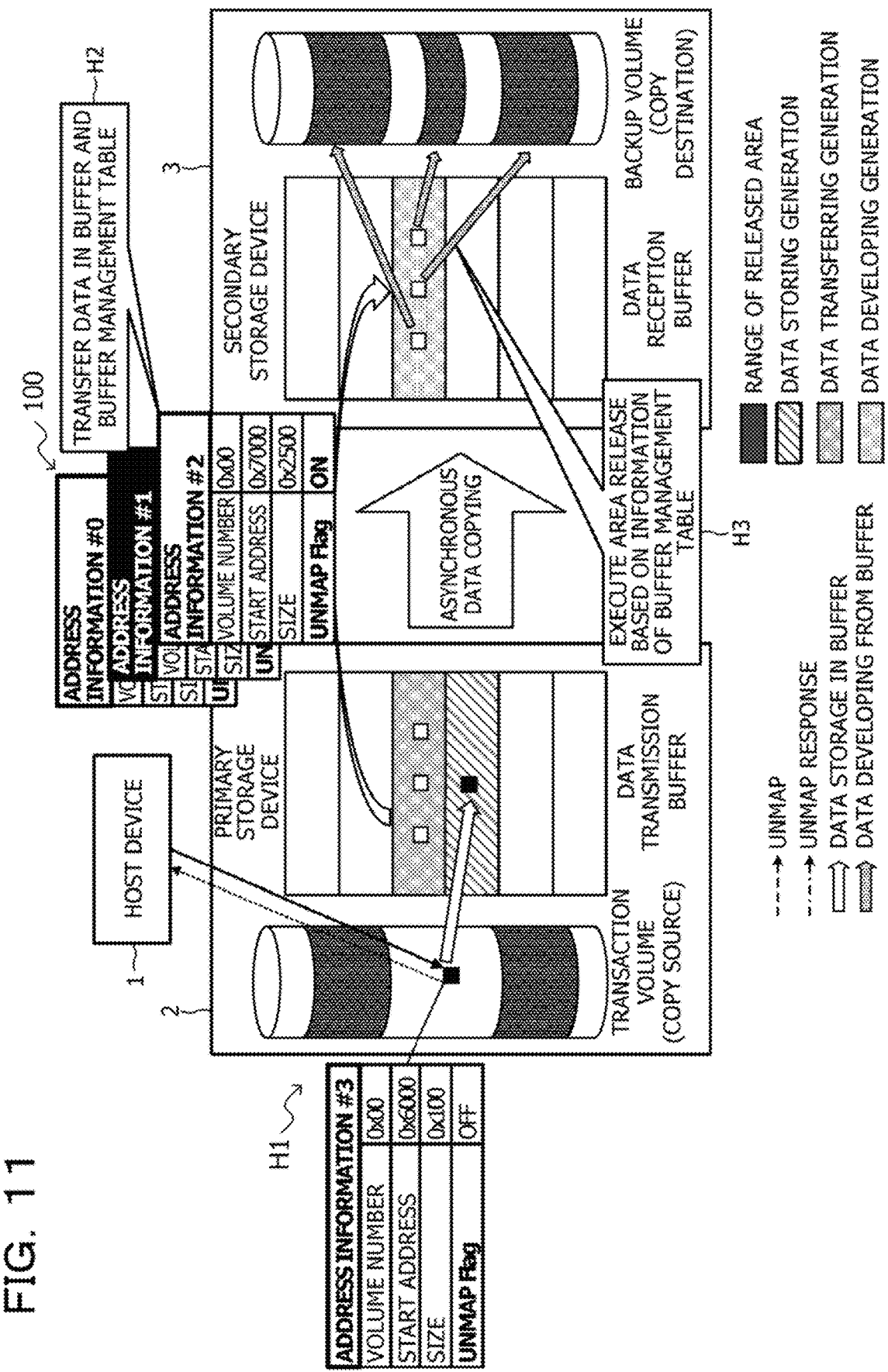
FIG. 11 is a block diagram illustrating a buffer transfer process and a process of writing data immediately after the issuance of the UNMAP command in the storage system illustrated in FIG. 5.

FIG. 10 is a block diagram illustrating a write process and a process of switching a buffer generation immediately after issuance of an UNMAP command in the storage system 100 illustrated in FIG. 5. FIG. 11 is a block diagram illustrating a buffer transfer process and a process of writing data immediately after the issuance of the UNMAP command in the storage system 100 illustrated in FIG. 5.

In a case where a write command is issued to the area having been subject to the UNMAP immediately after the UNMAP command is issued from the host device 1 to the transaction volume of the copy source, the transfer order needs to be assured such that the write data is after the UNMAP command. If the transfer of the write data operates first, release of the copy destination area by the UNMAP is performed after the data writing is performed in the backup volume of the copy destination, whereby the data written after the UNMAP is lost due to the physical area release process.

As indicated by a reference sign G1 in FIG. 10, it is assumed a case where, after the physical area of the copy source is released and dummy data is stored, data writing is further performed on the range having been subject to the UNMAP, such as address Information #1, before starting the data transfer of the data transmission buffer in which the data is stored. As indicated by a reference sign G2 in FIG. 10, in a case where the UNMAP that overlaps the write range is detected, the generation of the buffer is forcibly switched once. Then, as indicated by a reference sign H1 in FIG. 11, address information #3 is generated, and the write data is stored in a generation different from that of the buffer in which the dummy data of the UNMAP is stored. As indicated by a reference sign H2 in FIG. 11, the data and the address of the data transmission buffer in which the dummy data is stored are transferred. As indicated by a reference sign H3 in FIG. 11, the secondary storage device 3 receives the data and the address, and then the setting of the UNMAP Flag of the address information is checked to determine whether to execute a physical release of the backup volume of the copy destination. If the UNMAP Flag is ON, the physical area of the copy destination in the specified range is released.

The determination of the overlap between the UNMAP range and the write range may be made on the basis of the information associated with the volume number, the start address, and the size stored in the address information.

Figure 12:
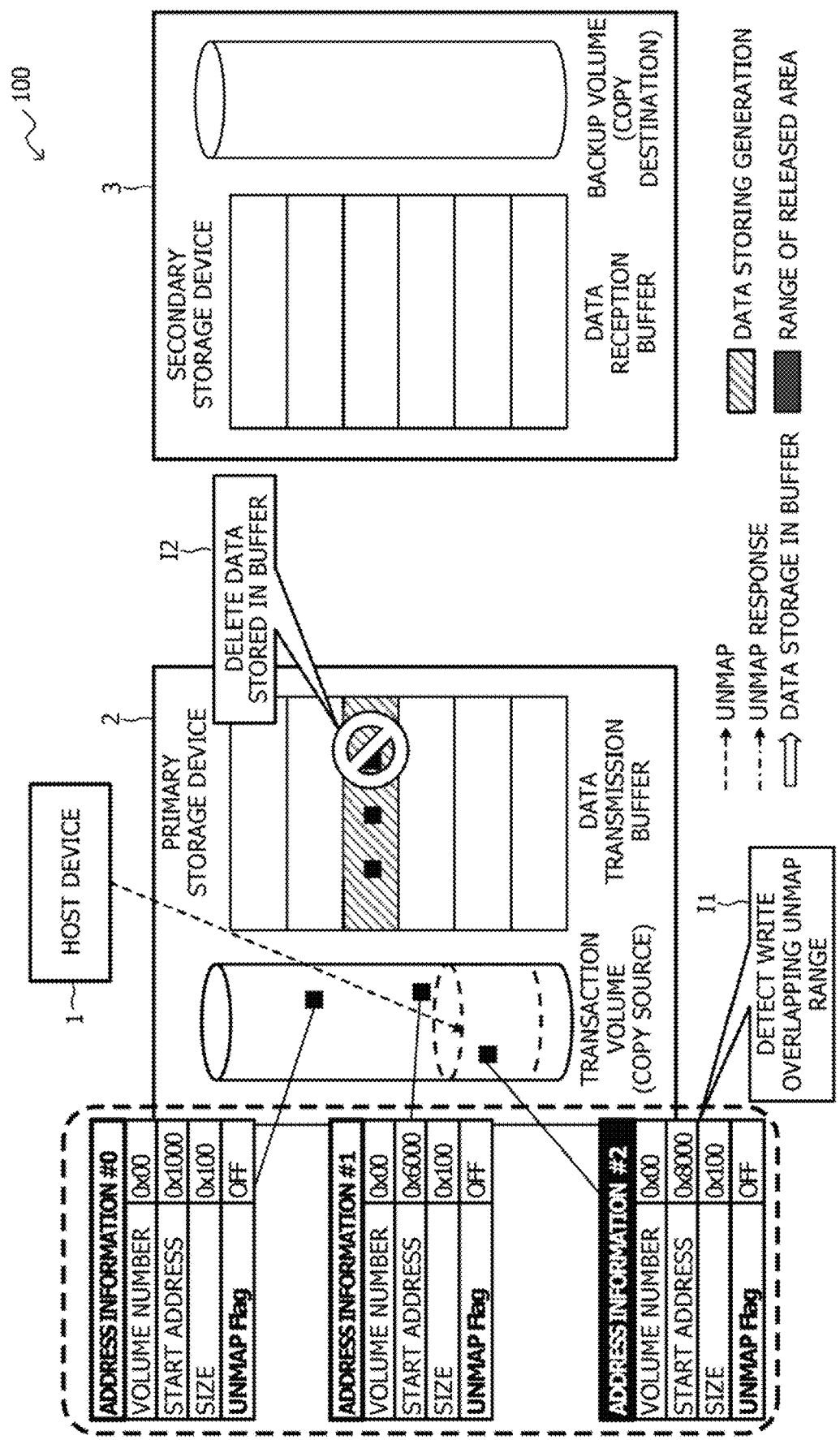
FIG. 12 is a block diagram illustrating the UNMAP process and a process of deleting stored data immediately after issuance of a data write command in the storage system illustrated in FIG. 5.
Figure 13:
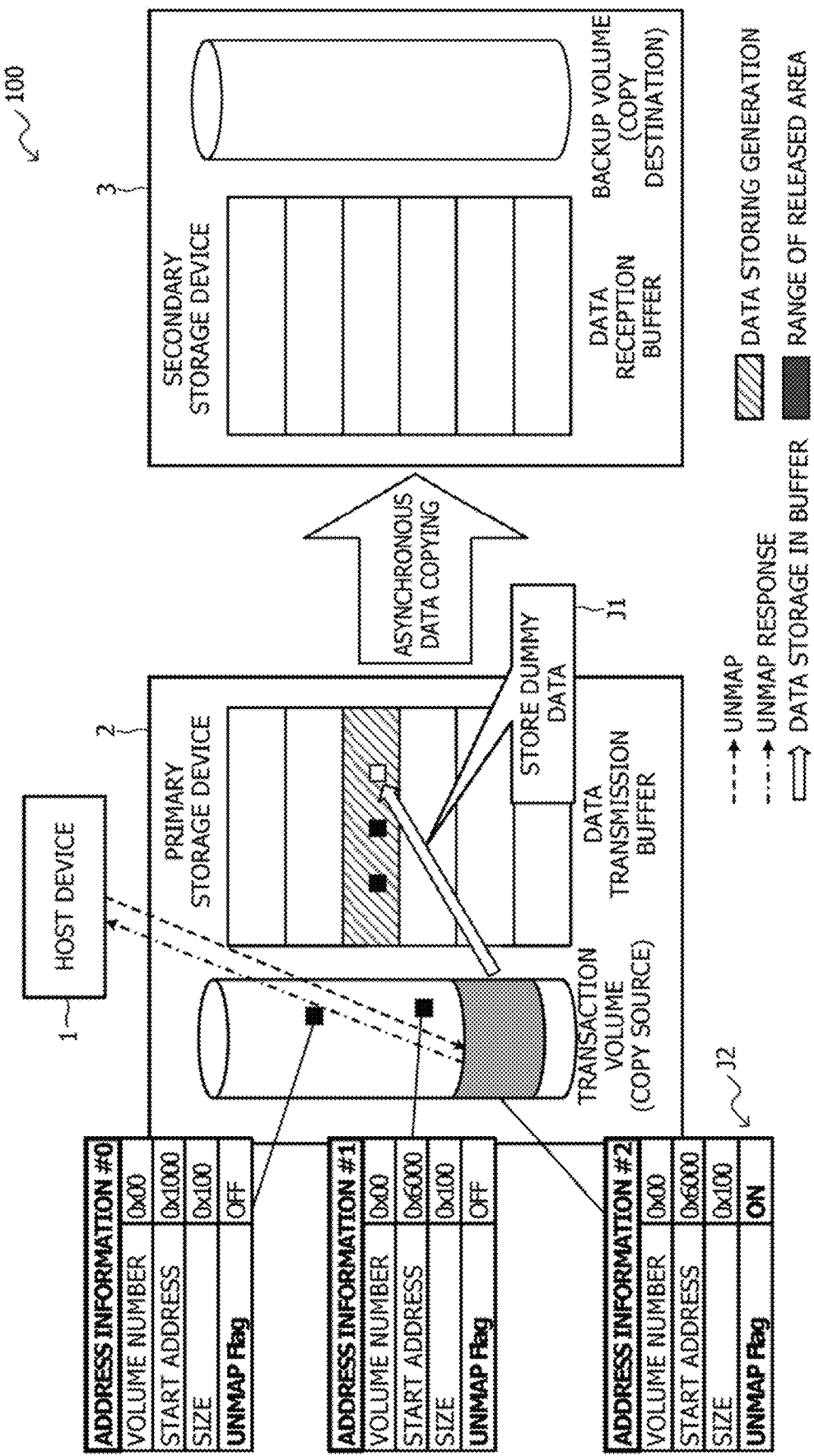
FIG. 13 is a block diagram illustrating the UNMAP process immediately after the issuance of the data write command in the storage system illustrated in FIG. 5.

FIG. 12 is a block diagram illustrating the UNMAP process and a process of deleting stored data immediately after issuance of a data write command in the storage system 100 illustrated in FIG. 5. FIG. 13 is a block diagram illustrating the UNMAP process immediately after the Issuance of the data write command In the storage system 100 illustrated in FIG. 5.

The address Information is checked to determine whether the range of the written data and the range of the UNMAP overlap. As indicated by a reference sign 11 in FIG. 12, in a case where an overlapping range is detected in the address information #2, even if the written data is transferred to the copy destination as it is, the data is subsequently subject to the UNMAP at the copy destination and disappears, which results in useless data transfer. Therefore, as indicated by a reference sign 12 in FIG. 12, the data stored in the buffer is deleted once. Thereafter, dummy data is stored in the buffer as indicated by a reference sign J1 in FIG. 13, and the UNMAP Flag of the address information #2 is set to ON as indicated by a reference sign J2 in FIG. 13, thereby executing data transfer processing of the UNMAP.

[B-2] Exemplary Operation

A process of writing data in the primary storage device 2 of the copy source in the storage system 100 as an exemplary embodiment will be described with reference to the flowchart (steps S1 to S10, and S12 to S15) illustrated in FIG. 14.

The write processing unit 211 accepts a data write from the host device 1 to the transaction volume (step S1).

The write processing unit 211 issues a write response to the host device 1 (step S2).

The write processing unit 211 determines whether a data transmission buffer capable of storing the write data has already been prepared (step S3).

If the data transmission buffer is not prepared (see NO route in step S3), the switching processing unit 213 newly allocates a data transmission buffer for one generation (step S4).

The write processing unit 211 stores the written data in the newly allocated data transmission buffer (step S5). Then, the process proceeds to step S13.

If the data transmission buffer has already been prepared in step S3 (see YES route in step S3), the search processing unit 212 checks the range of the write data from the address information (step S6).

The search processing unit 212 determines whether there is an UNMAP process that overlaps the range of the write data (step S7).

If there is an UNMAP process that overlaps the range of the write data (see YES route in step S7), the switching processing unit 213 switches the data transmission buffer of the storage destination from the latest generation to the next generation (step S8).

The write processing unit 211 transfers the data in the data transmission buffer of the generation in which the UNMAP information is stored to the secondary storage device 3 of the copy destination (step S9).

The write processing unit 211 stores the data written in the transaction volume in the data transmission buffer of the generation after the switching (step S10). Then, the process proceeds to step S13.

If there is no UNMAP process that overlaps the range of the write data in step S7 (see NO route in step S7), the write processing unit 211 stores the data written in the transaction volume in the data transmission buffer (step S12).

The write processing unit 211 registers the address and the size of the data written in the transaction volume in the address information (step S13).

The write processing unit 211 transfers the address information and the data in the data transmission buffer to the secondary storage device 3 of the copy destination (step S14).

The write processing unit 211 releases the buffer used for the data transfer (step S15). Then, the process of writing data in the primary storage device 2 of the copy source is terminated.

Next, a process of writing data in the secondary storage device 3 of the copy destination in the storage system 100 as an exemplary embodiment will be described with reference to the flowchart (steps S21 to S23) illustrated in FIG. 15.

The backup processing unit 311 writes the data in the data reception buffer in the backup volume of the copy destination on the basis of the address information (step S21).

The backup processing unit 311 returns a response of backup completion to the primary storage device 2 of the copy source (step S22).

The release processing unit 312 releases the data reception buffer used for the data transfer (step S23). Then, the process of writing data in the secondary storage device 3 of the copy destination is terminated.

Next, an UNMAP process in the primary storage device 2 of the copy source in the storage system 100 as an exemplary embodiment will be described with reference to the flowchart (steps S31 to S43) illustrated in FIG. 16.

The write processing unit 211 accepts an UNMAP command of the area to the transaction volume from the host device 1 (step S31).

The write processing unit 211 releases the physical area of the transaction volume of the copy source (step S32).

The write processing unit 211 issues a response of UNMAP completion to the host device 1 (step S33).

The write processing unit 211 determines whether a data transmission buffer capable of storing the UNMAP Information has already been prepared (step S34).

If the data transmission buffer is not prepared (see NO route in step S34), the switching processing unit 213 newly allocates a data transmission buffer for one generation (step S35).

The write processing unit 211 stores dummy data in the newly allocated data transmission buffer (step S36). Then, the process proceeds to step S41.

If the data transmission buffer has already been prepared in step S34 (see YES route in step S34), the search processing unit 212 checks the range of the data stored in the data transmission buffer from the address information (step S37).

The search processing unit 212 determines whether there is a range of the data transfer process that overlaps the range of the UNMAP process (step S38).

If there is a range of the data transfer process that overlaps the range of the UNMAP process (see YES route in step S38), the write processing unit 211 deletes the data stored in the data transmission buffer (step S39). Then, the process proceeds to step S40.

On the other hand, if there is no range of the data transfer process that overlaps the range of the UNMAP process (see NO route in step S38), the write processing unit 211 stores dummy data in the data transmission buffer (step S40).

The write processing unit 211 sets the UNMAP Flag to ON, and registers, in the address information, the address and the size of the area having been subject to the UNMAP process in the transaction volume (step S41).

The write processing unit 211 transfers the address information and the data in the data transmission buffer to the secondary storage device 3 of the copy destination (step S42).

The write processing unit 211 releases the buffer used for the data transfer (step S43). Then, the UNMAP process in the primary storage device 2 of the copy source is terminated.

Next, an UNMAP process in the secondary storage device 3 of the copy destination in the storage system 100 as an exemplary embodiment will be described with reference to the flowchart (steps S51 to S53) illustrated in FIG. 17.

The release processing unit 312 releases the physical area of the backup volume of the copy destination on the basis of the address information (step S51).

The release processing unit 312 returns a response of release completion of the physical area to the primary storage device 2 of the copy source (step S52).

The release processing unit 312 releases the data reception buffer used for the data transfer (step S53). Then, the UNMAP process in the secondary storage device 3 of the copy destination is terminated.

[B-3] Effects

According to the storage devices 2 and 3 and the storage control method according to the exemplary embodiment described above, for example, the following effects may be exerted.

While executing data backup processing with the secondary storage device 3 using the generation-managed data transmission buffer, the write processing unit 211 writes an area release command in the first generation of the data transmission buffer in a case where the area release command of the transaction volume is issued from the host device 1. In a case where the range of the data write processing requested by the host device 1 overlaps the range specified by the area release command written to the first generation by the write processing unit 211, the switching processing unit 213 switches the generation of the data transmission buffer from the first generation to the second generation.

As a result, the sequentiality of the process in data backup may be assured. Specifically, for example, it is possible to achieve both the area release process and the sequentiality assurance of data in inter-housing copying, whereby a reduction in capacity of the physical area used in inter-housing backup environment may be expected.

The switching processing unit 213 detects an overlap on the basis of the address information including the volume number of the transaction volume, the start address of the area, and the size of the area. As a result, detection of the overlapping range may be efficiently performed.

The write processing unit 211 registers a flag indicating Issuance of the area release command in the address information, and transfers the address information to the secondary storage device 3. As a result, the secondary storage device 3 may reliably execute the UNMAP process.

The write processing unit 211 deletes the data associated with the data write processing and written in the data transmission buffer, and writes dummy data in a case where an area release command is issued after a request for data write processing is issued and the range of the data write processing requested by the host device 1 overlaps the range specified by the area release command written in the first generation by the write processing unit 211. As a result, useless data transfer may be suppressed.

The backup processing unit 311 reads the area release command transferred from the primary storage device 2 and stored in the data reception buffer. The release processing unit 312 releases the area of the backup volume on the basis of the area release command read by the backup processing unit 311. As a result, the UNMAP process in the secondary storage device 3 may be performed.

[C] Others

The disclosed technique is not limited to the embodiment described above, and various modifications may be made without departing from the spirit of the present embodiment. Each of the configurations and processes according to the present embodiment may be selected as needed, or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage device communicably coupled to a host device and another storage device, the storage device comprising:
    a memory; and
    a processor coupled to the memory and configured to:
    write, in a case where an area release command of a transaction volume is issued from the host device while data backup processing is performed with the another storage device using a generation-managed transmission buffer, the area release command in a first generation of the transmission buffer; and
    switch, in a case where a range of data write processing requested by the host device overlaps a range specified by the area release command written in the first generation, a generation of the transmission buffer from the first generation to a second generation.

2. The storage device according to claim 1, wherein the processor detects the overlap on a basis of address information including a volume number of the transaction volume, a start address of an area, and a size of the area.

3. The storage device according to claim 2, wherein the write processor registers a flag that indicates issuance of the area release command in the address information, and transfers the address information to the another storage device.

4. The storage device according to claim 1, wherein the processor deletes data associated with the data write processing and written in the transmission buffer, and writes dummy data in a case where the area release command is issued after the request for the data write processing is issued and the range of the data write processing overlaps the range specified by the area release command written in the first generation.

5. The storage device according to claim 1, wherein the processor reads the area release command transferred from the another storage device and stored in a reception buffer; and
    releases an area of a backup volume on a basis of the area release command.

6. A storage control method comprising:
    writing, by a storage device communicably coupled to a host device and another storage device, in a case where an area release command of a transaction volume is issued from the host device while data backup processing is performed with the another storage device using a generation-managed transmission buffer, the area release command in a first generation of the transmission buffer; and
    switching, in a case where a range of data write processing requested by the host device overlaps a range specified by the area release command written in the first generation, a generation of the transmission buffer from the first generation to a second generation.

7. The storage control method according to claim 6, further comprising:
    detecting the overlap on a basis of address information including a volume number of the transaction volume, a start address of an area, and a size of the area.

8. The storage control method according to claim 7, further comprising:
    registering a flag that indicates issuance of the area release command in the address information; and
    transferring the address information to the another storage device.

9. The storage control method according to claim 6, further comprising:
    deleting data associated with the data write processing and written in the transmission buffer; and
    writing dummy data in a case where the area release command is issued after the request for the data write processing is issued and the range of the data write processing overlaps the range specified by the area release command written in the first generation.

10. The storage control method according to claim 6, further comprising:
    reading the area release command transferred from the another storage device and stored in a reception buffer; and
    releasing an area of a backup volume on a basis of the area release command.

* * * * *